Figure 1:
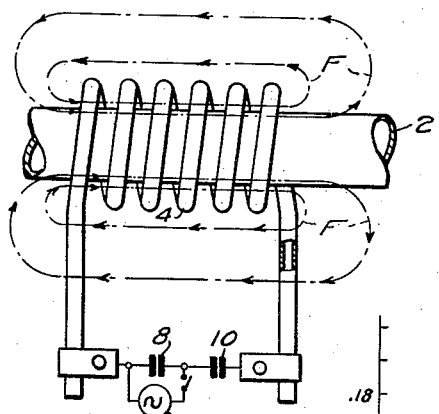

Sept. 24, 1946.  R. M. BAKER  2,408,190
MAGNETIC INDUCTION HEATING OF THIN-WALLED NONMAGNETIC METALLIC TUBES
Filed Jan. 27, 1944

For hollow brass cylinder having wall thickness of .1 of a centimeter, an outer diameter of 10 centimeters and a resistivity of $7\times10^{-6}$ ohms-centimeters.

WITNESSES:

INVENTOR
Robert M. Baker.
BY
ATTORNEY

Patented Sept. 24, 1946

2,408,190

UNITED STATES PATENT OFFICE 2,408,190

MAGNETIC INDUCTION HEATING OF THIN-WALLED NONMAGNETIC METALLIC TUBES

Robert M. Baker, Pittsburgh, Pa., assignor to Westinghouse Electric Corporation, East Pittsburgh, Pa., a corporation of Pennsylvania Application January 27, 1944, Serial No. 519,866

2 Claims. (Cl. 219—13)

Heat can be generated in a piece of metal or other conducting material by wrapping a heating-coil helically, or otherwise, around the piece, and causing alternating current of suitable magnitude and frequency to flow in the coil. The current produces a pulsating magnetic field inside the heating-coil which induces circulating electrical currents in the work-piece that add heat to it. This type of heating is called induction heating with longitudinal magnetic flux because the flux lines which interlink the work-piece are axially directed inside the heating-coil, and has many applications in industrial processes, of which hardening or heat-treating of surfaces, heating slugs in a continuous process for forging, and brazing are a few examples. My invention relates to this type of heat-treatment.

Compared to other heat-treating systems, induction heating has the advantages of concentrating the heat in a small space so that the work-piece can be quickly heated up, whether it is stationary or travelling, and of permitting the degree of heating to be accurately controlled. However, the maximum amount of power that can be efficiently and effectively introduced into the work-piece depends on the physical relationships between the heating-coil and the work-piece, and their characteristics. Generally, the frequencies used for induction heating of metal depend on the size and the electrical and magnetic properties of the work-piece, and may vary from common commercial frequencies of 25 to 60 cycles per second for heating joints in iron pipes, to a few million cycles for soldering small non-magnetic pieces of metal. Low frequencies up to 10,000 cycles, or slightly more, can be obtained with high power from rotating electrodynamic machines; but for high power at high frequencies, say about 14,000 cycles and above, one must resort to spark-gap oscillators or tube-oscillators. A very successful recent application of such induction heating involving high- or radio-frequency power is the treating of electrolytic tin-plate for brightening and solidifying its tin-coating. In a process of this kind, disclosed in copending application Serial No. 464,040 of Glenn E. Stoltz and myself, filed October 31, 1942, the tinned surface of an electrolytically tinned ferrous strip is melted while moving through a helical heating-coil at a speed of about 1000 feet per minute, the heating-coil being supplied with electrical energy at a rate of about 1200 kilowatts but at a frequency of 200,000 cycles.

My invention is directed to the application of magnetic induction heating with longitudinal flux for heat-treating hollow nonmagnetic cylindrical metallic materials with frequencies in the rotating machine range; and it is among the objects of my invention to efficiently convert electrical energy of low frequency and relatively high power-factor into heat for heating borderline sizes of thin-wall nonmagnetic metal tubes.

Figure 2:
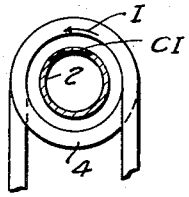
Figure 3:
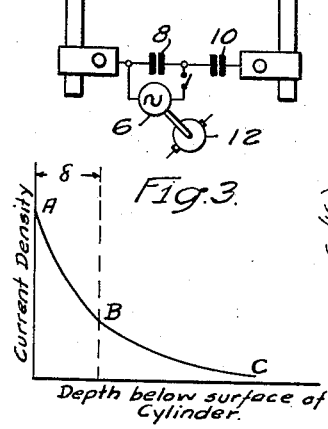
Figure 4:
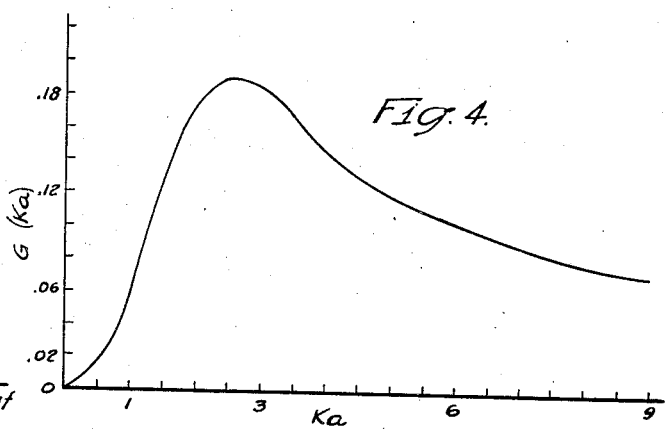
Figure 5:
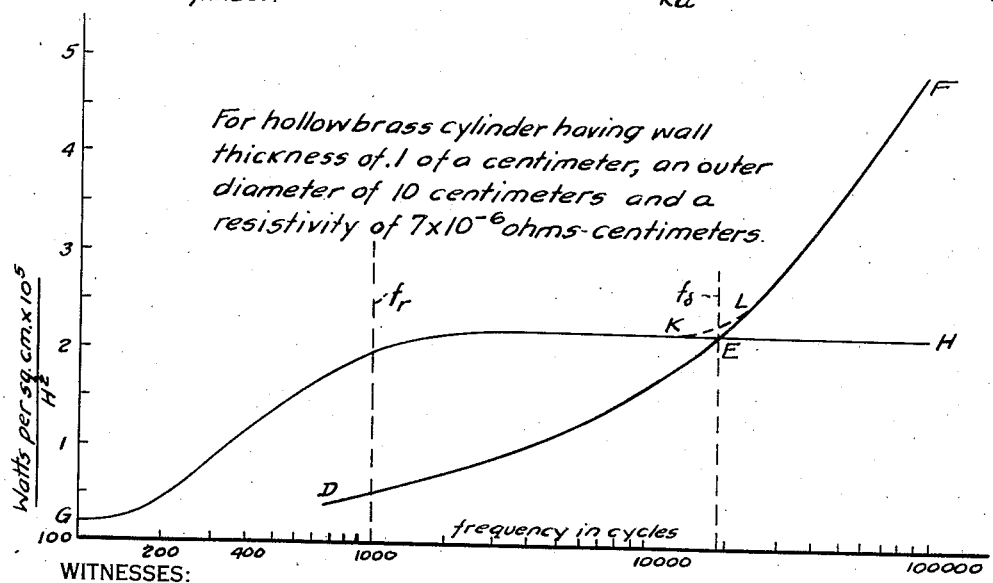

Advantages, features and objects of my invention will be discernible from the following description thereof which is to be taken in connection with the accompanying schematic drawing for illustrating the principles thereof. In the drawing which is not to scale:

Figure 1 is an axial or longitudinal view of an induction heating system embodying my invention, for heating a metal tube, Fig. 2 is a transverse view of the heating-coil and tube of Fig. 1, Fig. 3 is a curve for indicating the induced current distribution in a piece of metal being inductively heated with a coil-current having a frequency such that the induced currents in the metal do not penetrate to the center thereof, Fig. 4 is a graphic representation of a curve useful for ascertaining the induction heating rate of non-magnetic metallic cylinders, under certain conditions, and Fig. 5 is a graphic representation of the heating rate or power input to a particular hollow brass cylinder as a function of the frequency of the current supplied to the induction heating-coil, the abscissae being on a logarithmic scale.

Magnetic induction heating can be explained briefly with reference to Figs. 1 and 2 which show a hollow cylinder or tube 2 of a nonmagnetic metal centrally inside a surrounding heating-coil 4 in the form of a helix of hollow copper tubing, the heating-coil being hollow so that it may be water cooled in any suitable manner. The heating-coil derives its energy from an alternator or induction generator 6 to the output of which it is connected by any suitable circuit including, if desired, power-factor correcting capacitors 8 and 10, either in series or in parallel with the heating-coil, or both as shown. The alternator 6 is of any common type for delivering alternating current at frequencies up to approximately 10,000 to 12,000 cycles per second, more or less, at high power, and is driven by an electric motor 12 of controllable speed for controlling the frequency of the alternator output.

When a current I is caused to flow in the heating-coil 4, a magnetic field is produced having magnetic flux lines F which are longitudinal inside the heating-coil. A part of these flux lines interlinks tube 2 and causes a countercurrent CI to be induced in the tube, as illustrated by the respective arrows in Fig. 2. If the wall of the tube 2 is sufficiently thick and the frequency of the supplied current sufficiently high, the induced current density is highest at the outer surface of the tube and decreases exponentially in the direction radially inward, as shown in Fig. 3 where the ordinates are current densities and the abscissae depths below the surface. To use generalities by which such curve obtains and correspondingly compute the induction heating involves complex mathematics and complicated formulae. For a simplified approach, a factor known as the depth of current penetration has been introduced, this factor being generally designated by the symbol $\delta$. This depth of current penetration is considered as the radial or inward depth from the outer surface of a material being inductively heated to which a current of uniform density must penetrate in order to produce the same heating as that of the actually induced current of non-uniform density distributed radially or inwardly from the surface in the manner illustrated by the curve A—B—C of Fig. 3.

In general, for nonmagnetic metals, (1) $$\delta = c\sqrt{\frac{r}{f}} \text{ centimeters}$$

where $r$ is the electrical resistivity of the metal in ohm-centimeters; $f$ is the frequency in cycles per second of the current flowing in the heating-coil, and $c$ is a constant depending on the configuration of the outer surface of the material being inductively heated. For general purposes, $c$ can be assumed to be about 5030 for substantially flat materials, varying only slightly therefrom for curved materials, within about 15%. For a brass material, such as later described, the actual heating produced by the actual current to a depth $\delta$ beneath the surface, along the curve-portion A—B, is about 87% of the total heating, provided the wall thickness is over about three times $\delta$.

For economical low cost apparatus and efficient induction heating, it has generally been accepted, and it has been the practice, to inductively heat tubular non-magnetic materials in a manner so that the depth of current penetration is materially less than the wall thickness.

For solid cylinders, a ratio between the radius of the cylinder and the depth of current penetration of not less than about 4:1 has been recommended in the Northrup Patent 1,694,792 of December 11, 1928. For such condition, in which the depth of current penetration is considerably less than the distance to the center of a solid metal, so that substantially all the current distributes exponentially as shown in Fig. 3, the rate of heating can be expressed in watts per cubic centimeter of the part of the cylinder which is radially encompassed by the heating-coil, provided end effects can be ignored, which is the case when the coil length is about 5 times the spacing between the outer surface of a cylinder being heated and the inside diameter of the heating-coil. This heating is expressed by the formula (2) $$W = \frac{1}{2}H^2 f G(Ka) 10^{-7}$$

watts per cubic centimeter where H is the peak magnetizing force in oersteds at the surface of the piece being heated; $f$ is the frequency in cycles per second; and G is a function of the product of K and $a$, the parameter $Ka$ being used so as to make the heating formula perfectly general and applicable to any frequency and any cylinder. For this G function (3) $$K = \sqrt{\frac{8\pi^2 f 10^{-9}}{r}}$$

and $a$ is the radius of the cylinder in centimeters.

The G function for solid cylinders is shown in Fig. 4, as a function of the product of K and $a$, and can be derived either experimentally or mathematically.

For a hollow cylinder having a thick wall, by thick wall meaning one having a thickness appreciably greater, for a given frequency, than the depth of current penetration so that the induced current can distribute itself in accordance with the curve A—B—C of Fig. 3, formula 2 is applicable when multiplied by the ratio of the cross-sectional area of a solid cylinder to that of the hollow cylinder, because of the lesser metal volume of the hollow cylinder.

For a solid cylinder, the foregoing G function becomes equal to about $$\frac{1}{\sqrt{2}\,Ka}$$

when the depth of current penetration is less than about ½ the radius of the cylinder, so that formula 2 for such case, can be simplified to (4) $$W' = .63\ 10^{-4} H\sqrt{rf}$$

watts per square centimeter of the outer surface of the cylinder which is directly within the coil. The total watts induced in the cylinder would be the value of W' multiplied by such outer surface.

The required watts per square centimeter will depend, of course, on how much heat is to be added to the piece, and can be computed from the desired increase in its temperature, the time in which such heating is to be effected, and the specific heat and volume of the material to be heated in this time. For moving material, the volume can be relatively very large.

If formulae 1 and 2 are used to determine the frequency for heating a thin-wall cylinder having a wall-thickness less than about ⅙ of its outer diameter, and it is assumed that the depth of current penetration is to be equal to or less than the wall thickness, values are obtained which are higher than I have found necessary for economical and effective heating. I consider this to be an important discovery. One reason is that there have been instances where frequencies were indicated that could be obtained only with spark-gap or tube-oscillator equipments. For example, consider a hollow brass cylinder with a resistivity of $7 \times 10^{-6}$ ohm-centimeters, having a diameter of 10 centimeters and a wall thickness of .1 of a centimeter. From formula 1, the frequency required for a depth of current penetration equal to the wall thickness should be $$f = \frac{5030^2 r}{\delta^2} = \frac{25.3 \times 10^6 \times 7 \times 10^{-6}}{.1^2} = 17{,}710 \text{ cycles}$$

In accordance with my invention lesser frequencies can be used, although the depth penetration is several times the wall thickness of the hollow cylinder, for in such case the hollow cylinder can be considered as the short-circuited secondary of an air-cored transformer, with substantially uniform current density through the thickness of the wall.

Referring to Fig. 3, at the point where the depth of current penetration line cuts the exponential curve, the current density would appear to be significantly less than that at the outer surface of the cylinder. However, I believe that in a thin-wall cylinder, the thin wall prevents the current from distributing in accordance with the curve-portion embracing B—C, so that the current density near the inner surface of the cylinder is raised, thereby providing a more uniform distribution of current in the wall than is indicated by a curve such as Fig. 3.

The power input to a thin-wall hollow cylinder by an alternating source having a frequency yielding a depth of penetration, according to formula 1, which is greater than the wall thickness, is no longer represented by formula 2, but I have found that it can be represented by the formula $$(5) \qquad W'' = \frac{1.23 f^3 I^2 tr H^2 10^{-16}}{r^2 + 3.87 t^2 f^2 d^2 10^{-16}}$$

watts per square centimeter of the outer surface of the hollow cylinder, which is directly inside the heating coil; where $d$ is the outer diameter of a cylinder in centimeters; and $t$ is the thickness of the cylinder wall in centimeters.

My invention, in its general aspects, can be explained with reference to Fig. 5 in which the ordinates represent watts per unit of the square of magnetizing force per square centimeter of outer cylindrical surface within the effective heating-coil boundaries, and the abscissae represent the frequencies for obtaining such wattages for the aforesaid brass cylinder. Curve D—E—F is derived from formula 4 and represents the least frequencies, according to prior practice, at which the corresponding ordinate watts were thought to be obtainable. Curve G—E—H is derived from formula 5 when the heating-coil and cylinder are considered an air-cored transformer, or when the depth of current penetration is greater than the wall thickness. The two curves can be joined by a section K—L for producing a representative curve G—K—L—F under which the hollow brass cylinder actually absorbs power, so that the parts of the curves D—E—L and K—E—H therebelow can be ignored for practical purposes.

It is seen that the power input increases rapidly at first as the frequency is increased, then the power input levels off and becomes constant with increased frequency, and finally increases again with frequency. I explain this in the following manner. At very low frequencies the depth of current penetration is greater than the wall thickness and the heating is proportional to the square of the induced voltage and, therefore, of the frequency. However, when the induced current becomes approximately equal to the current in the heating-coil, increasing the frequency does not induce any greater voltage in the work-piece so that the heating remains constant until the frequency reaches a value such that the depth of current penetration becomes less than the wall thickness and the current density distribution follows more closely the curve of Fig. 3. When this arises, the heating in the work-piece is represented by formula 2 or 4 instead of formula 5.

In Fig. 5, the vertical dotted line $f_r$ indicates an arbitrary value of frequency where the input has almost reached the flat part of the curve, 90% of the value being considered satisfactorily accurate. The vertical dotted line $f\delta$ indicates the frequency at about which the depth of current penetration passes the wall thickness, the depth of current penetration for frequencies to the right of this line $f\delta$ being less than the wall thickness. In other words, for wattages requiring frequencies intersecting the curve to the right of $f\delta$ formula 2 or 4 can be used; but for wattages at or below that for the horizontal part of the curve, lower frequencies can actually be used than would be indicated by curve D—E—F.

The two frequencies $f_r$ and $f\delta$ comes closer together as the ratio of the diameter of the hollow cylinder to its wall thickness is decreased. $f_r$ can be represented by the formula $$(6) \qquad f_r = \frac{153 r 10^6}{td}$$

and $f\delta$ can be represented by the formula $$(7) \qquad f\delta = \frac{25.6 r 10^6}{t^2}$$

The ratio of these frequencies is, therefore, $$(8) \qquad \frac{f\delta}{f_r} = .167 \frac{d}{t}$$

This shows that the two frequencies coincide approximately when the outside diameter of the hollow cylinder is six times the wall thickness, and become farther apart as the ratio of the diameter to wall thickness increases. Accordingly, by thin wall I mean a tube in which the wall thickness is less than about ⅙ of the outer diameter.

If satisfactory power input can be obtained at a frequency $f\delta$, it is also possible to obtain the same satisfactory input at a lower frequency down to $f_r$, so that the most economical or available power source can be chosen. The lower frequency also results in an improved power factor at the heating-coil terminals. In the specific case of the brass cylinder, frequencies of 17,000 to 18,000 cycles are at present beyond the range of rotary alternators, but frequencies of 10,000 and below are easily obtainable. Since uniform heating can be obtained, in accordance with my invention, with lower frequencies, it is evident that such a brass cylinder can be efficiently heated at minimum cost with rotary equipment.

While I have described my invention in connection with a hollow cylinder, it is apparent that it is generally applicable to thin-wall nonmagnetic metal tubes of other shapes so long as the inner dimensions are, on the whole, more than about 6 times the maximum thickness of the wall, as a whole. Of course, irregularities or peculiar shapes may give other relations, of less than ⅙, in a limited region, without operating outside the scope of my invention.

The resistivity of a material changes with temperature; but for materials having small changes of resistivity with temperature, any value in the range of temperatures in which the material is inductively heat-treated will yield results satisfactory for practical purposes. Where the resistivity changes may be large, however, the average value of resistivity between the temperatures of the material immediately before and after induction heating is desirable for determining power input, while the maximum value is desirable for frequency determinations, in order to operate with a factor of safety; although in general the average value can, as a rule, be used without too serious discrepancies.

I claim as my invention:

1. A method of efficiently and effectively magnetically inductively heating hollow nonmagnetic metallic cylindrical material having an outer diameter $d$, in centimeters, generally in excess of six times its wall-thickness $t$, in centimeters, which method comprises passing the hollow cylindrical material in the direction of its axis through an induction heating-coil, and energizing the heating-coil from a rotary alternator delivering an alternating current having a frequency in cycles per second, in a range between $$\frac{153r10^6}{td}$$

and $$\frac{25.6r10^6}{t^2}$$

where $r$ is the resistivity of the material in ohm-centimeters.

2. A method of efficiently and effectively magnetically inductively heating hollow nonmagnetic metallic cylindrical material having a minimum outer dimension $d$, in centimeters, in excess of six times the thickness $t$ of its wall, in centimeters, which method comprises placing the material centrally in an axial alternating magnetic field having a frequency in cycles per second which is greater than $$\frac{153r10^6}{td}$$

but less than $$\frac{25.6r10^6}{t^2}$$

where $r$ in ohm-centimeters is the resistivity of the material.

ROBERT M. BAKER.